United States Patent [19]

Homola et al.

[11] 4,438,156
[45] Mar. 20, 1984

[54] MONO-PARTICLE MAGNETIC DISPERSION IN ORGANIC POLYMERS FOR MAGNETIC RECORDING

[75] Inventors: Andrew M. Homola, Morgan Hill; Max R. Lorenz, San Jose, both of Calif.

[73] Assignee: International Business Machines Corporation, Armonk, N.Y.

[21] Appl. No.: 431,406

[22] Filed: Sep. 30, 1982

[51] Int. Cl.$^3$ .................................... H01F 10/02
[52] U.S. Cl. .................... 427/57; 252/62.54; 427/127; 427/128
[58] Field of Search ............ 427/57, 127, 128; 252/62.53, 62.54; 428/900, 694

[56] References Cited

U.S. PATENT DOCUMENTS 4,280,918 7/1981 Homola et al. ............ 252/62.53

Primary Examiner—Bernard D. Pianalto
Attorney, Agent, or Firm—Walter J. Madden, Jr.

[57] ABSTRACT

A method for producing a magnetic recording composition involves preparing an aqeuous dispersion of magnetic particles and colloidal silica particles, the pH of this dispersion being adjusted so that the magnetic and silica particles are electrostatically attracted to and bond to each other, removing the water from the dispersion, and dispersing the silica-coated magnetic particles in an organic liquid binder system for application to a recording substrate.

8 Claims, 10 Drawing Figures

1μM

1μM

1μM

1μM

NOISE SPECTRUM AT IDENTICAL
SIGNAL AMPLITUDES

SIGNAL-TO-NOISE RATIO AT PEAK ENERGY AFTER SUBTRACTION
OF AMPLIFIER NOISE (14 MEGATRANSITIONS, 20 MHZ BANDWIDTH,
30 KHZ RESOLUTION BANDWIDTH)

MEDIA NOISE
BEST PRIOR ART COATING ⟶ 27dB
PRESENT COATING ⟶ 35dB

MONO-PARTICLE MAGNETIC DISPERSION IN ORGANIC POLYMERS FOR MAGNETIC RECORDING

TECHNICAL FIELD

This invention relates to methods for producing magnetic coatings having magnetic particles therein which are of small size, of uniform distribution throughout the coating, and magnetically aligned.

BACKGROUND ART

In the preparation of magnetic recording materials, such as for magnetic disks and tapes, it has been common to use magnetic particles, such as gamma $Fe_2O_3$, dispersed in a binder mixture to form the magnetic recording material. A dispersion is usually formed by milling the ingredients together for an extended period of time in an effort to thoroughly coat the magnetic particles with the binder ingredients and to break up collections or aggregations of such particles. Magnetic particles of this type tend to cling together and it is desirable to reduce or eliminate this aggregation of particles in order to produce smaller effective magnetic particle sizes for higher density magnetic recording. The degree of uniform dispersion of the magnetic particles in the binder is an important factor in determining the final quality of the magnetic coating, as measured by the parameters of surface smoothness, orientation ratio, signal-to-noise ratio, off-track performance, modulation noise, coercive force and wear properties.

After filtering, this dispersion is coated onto a substrate by spin coating, dip coating, spray coating or doctor blade (gravure) coating. The magnetic particles in the wet coating are then magnetically aligned by moving the coated substrate past a magnetic field. The coating is then cured to improve hardness and durability. The cured magnetic coating may be ground to reduce the coating thickness and then buffed to decrease surface roughness.

In order to increase the recording areal density, the coating thickness has to be reduced. Mechanical grinding to less than 5000 Å is difficult, if not beyond the limit of present technology. Also, as the coating thickness is reduced, the signal amplitude is decreased and this presents a major problem. New, higher moment particles and a higher pigment volume concentration (PVC) are needed. PVC may be defined as the percentage of magnetic material in the coating relative to the total volume of the binder material and the volume of the magnetic material. The PVC of current magnetic coatings is about 20–30%, and it is difficult to increase this and still maintain the rheological properties of the magnetic particle dispersion.

THE INVENTION

U.S. Pat. No. 4,280,918, assigned to the same assignee as the present application, shows a process for producing aqueous dispersions of magnetic particles coated with colloidal silica, the silica coating serving to prevent or reduce the undesirable agglomeration of the magnetic particles. The aqueous dispersion of magnetic particles produced according to U.S. Pat. No. 4,280,918, was intended primarily for use in aqueous dispersion form in the process for producing magnetic recording coatings described in U.S. Pat. No. 4,333,961, assigned to the same assignee as the present application. In U.S. Pat. No. 4,333,961, an electrostatically charged active layer is produced on a substrate and the silica coated magnetic particles in the aqueous dispersion are brought into contact with this active layer, the particles having a charge opposite to that of the active layer so as to be electrostatically attracted and bonded to the active layer. Unexpectedly, we have found however, that the particles of U.S. Pat. No. 4,280,918 can be used in a non-aqueous binder system by first removing the water from the dispersion to produce a magnetic coating of superior quality. The present invention is directed to a method of utilizing particles such as produced in the above U.S. Pat. No. 4,280,918 in magnetic binder systems containing organic solvents. This is accomplished by transferring the coated magnetic particles from the aqueous environment into a nonaqueous binder system.

DESCRIPTION OF THE DRAWINGS

FIG. 2c is a scanning electron microscope (SEM) photograph of the sample whose B-H curve is shown in FIG. 2a;

FIG. 3c is a scanning electron microscope (SEM) photograph of the coating whose B-H curve is shown in FIG. 3a;

DESCRIPTION OF THE BEST MODE AND INDUSTRIAL APPLICABILITY

Figure 1:
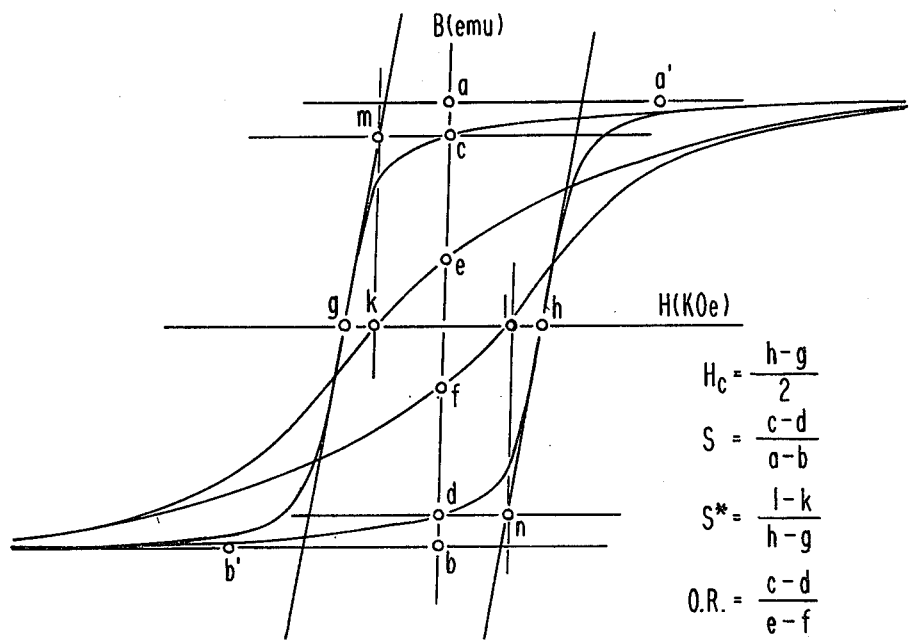
FIG. 1 is a hypothetical B-H magnetization curve illustrating the definition of the important magnetic coating parameters of coercivity $H_c$, squareness S, switching field distribution $S^*$, and orientation ratio O.R.

In accordance with the first step of the process of the present invention, a suitable dry magnetic particle material, such as gamma $Fe_2O_3$, is mixed with a suitable acid, such as hydrochloric acid, and the resulting mixture is stirred for a period of time. This mixing facilitates separation of the magnetic particles by dissolving bridges therebetween, and also narrows the particle size distribution range in the resulting dispersion by dissolution of the smaller size magnetic particles.

After this mixing, the pH of the magnetic particle mixture is adjusted to a suitable value to produce a positive electrostatic charge on the magnetic particles. Iron oxide particles exhibit a significant positive electrostatic charge in the pH region between 3 and 4, and the pH of the slurry containing the magnetic particles is adjusted to a value within this range. Colloidal particles of silica are prepared in a slurry and the pH of this slurry is adjusted to a value which will produce a negative electrostatic charge on the silica particles. Colloidal silica particles exhibit a significant negative electrostatic charge in the pH range from 3 to 4, and a value within this range is selected for matching with the pH of the slurry containing the magnetic particles.

The colloidal silica particles are added to the slurry containing the iron oxide particles and the mixture is stirred, preferably in the presence of ultrasonic treatment, to facilitate reaction. The colloidal silica particles, with their negative electrostatic charge, are attracted to the positively charged iron oxide particles. An excess of colloidal silica is preferably added to the mixture so that, as aggregated iron oxide particles are separated by the mixing and ultrasonic treatment, sufficient silica particles are available to quickly coat the separated magnetic particles before they can become attracted again to other magnetic particles.

After coating, the magnetic particles with the absorbed monolayer of protective colloids irreversibly bonded thereto are spaced far enough apart from each other so that their mutual magnetic attraction and tendency to aggregate are significantly reduced. The bonds between the magnetic particles and the silica particles become irreversible by virtue of the chemical reaction occurring.

The minimum separation distance between magnetic particles can be conveniently altered by using protective colloids of various particle size. Materials such as mono-dispersed colloidal silica sold by DuPont under the trademark "Ludox" are available in a wide range of particle size (70 to 220 Å). Thus, in applications requiring dense coatings of magnetic particles, a small size of the protective colloid, i.e., Ludox SM, 70 Å or smaller particle size, would be used. For other applications, a larger size (220 Å) protective colloid could be utilized.

The silica-coated magnetic particles are now solvent exchanged through a suitable technique such as centrifugation, magnetic separation, filtration, or other concentrating method. The concentrated particles are redispersed in a water-compatible organic solvent and the process is repeated until the desired degree of solvent exchange is reached. Alternatively, if it is desired to use non-water compatible or nonpolar solvents, the surface of the silica particles may be modified by a suitable method, such as esterification, as will be described more in detail below, and the solvent exchange carried out as described above.

As an additional alternative, a concentrate of the water-based particles can be dried in a vacuum by freeze-dry or by spray dry techniques. A dry powder of silica-coated Fe$_2$O$_3$ particles was found to be redispersible in the tested formulation.

One type of non-aqueous binder system suitable for dispersion of the coated magnetic particles is the modified epoxy/phenolic system described in copending application Ser. No. 260,440, filed May 4, 1981 (SA9-80-039). A number of magnetic recording disks were made and tested using this binder system. The coating mixture was prepared by introducing the solvent exchange silica-coated magnetic particles into the liquid binder and dispersing the particles therein using ultrasonic mixing. After suitable mixing had been achieved, the dispersion was applied to a substrate by spin coating and the magnetic particles therein were magnetically aligned in the uncured coating. Following magnetic alignment, the coating was cured and a number of tests performed on the finished disk.

Figure 2A:
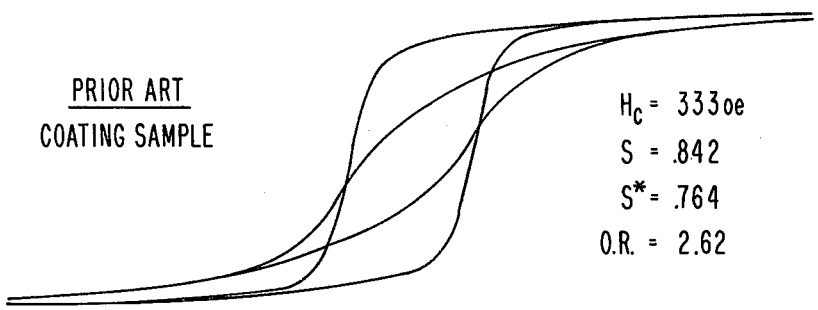
FIG. 2a is a B-H curve for a small sample of an oriented current magnetic coating composition.
Figure 2B:
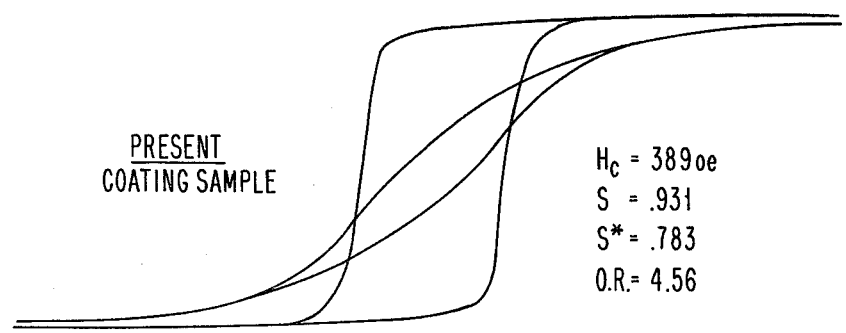
FIG. 2b is a B-H curve for a small sample of an oriented magnetic coating composition in accordance with the present invention.
Figure 3A:
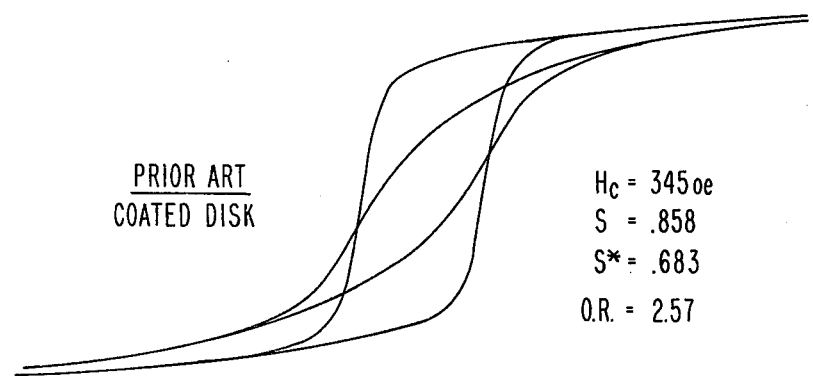
FIG. 3a is a B-H curve for a sample of a current magnetic coating composition applied to a metallic substrate to form a magnetic recording disk.
Figure 3B:
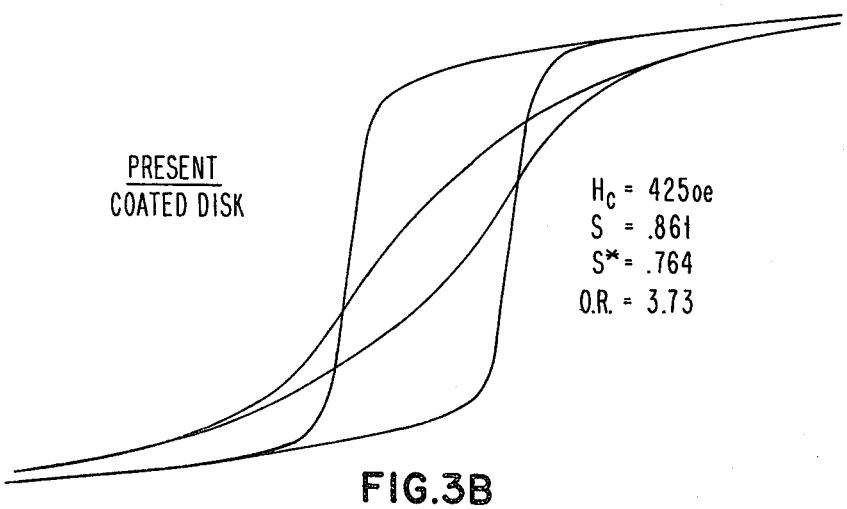
FIG. 3b is a B-H curve for a sample of a magnetic coating composition in accordance with the present invention applied to a metallic substrate to form a magnetic recording disk.
Figure 2C:
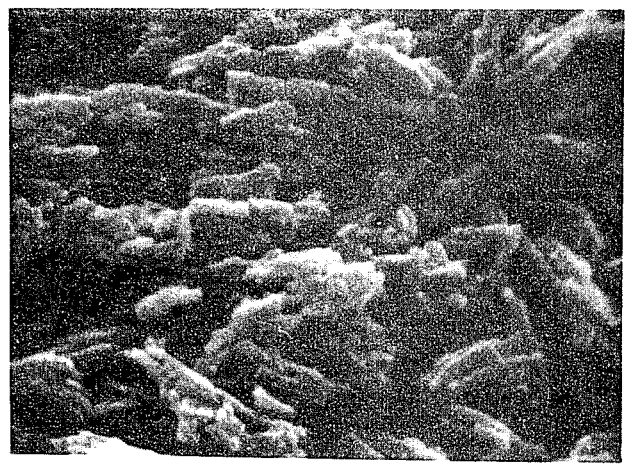
Figure 2D:
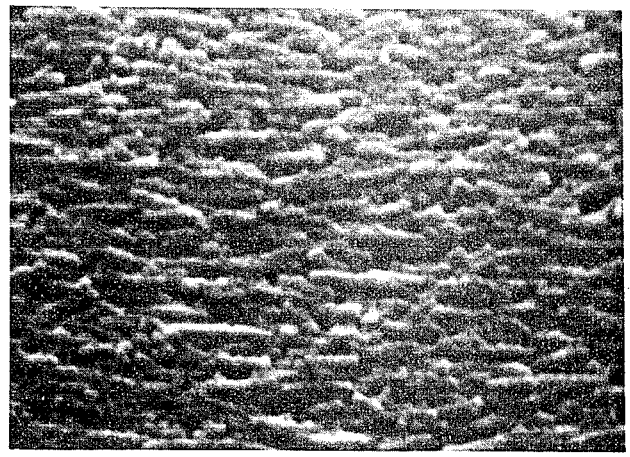
FIG. 2d is an SEM photograph of the coating sample whose B-H curve is shown in FIG. 2b.
Figure 3C:
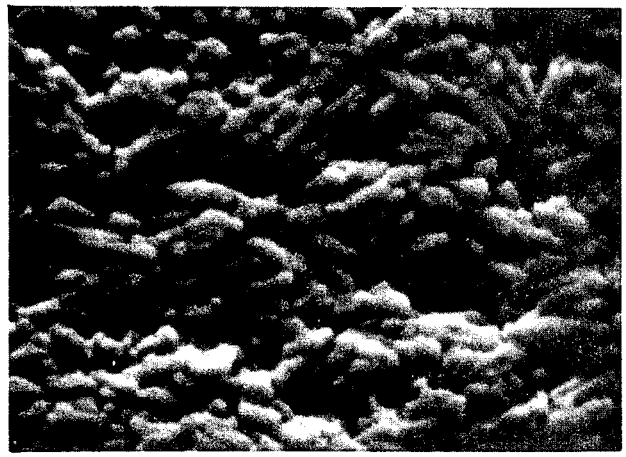
Figure 3D:
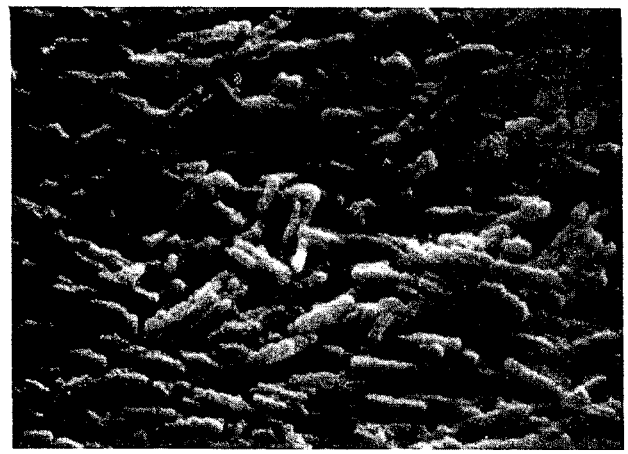
FIG. 3d is an SEM photograph of the coating whose B-H curve is shown in FIG. 3b.

FIG. 1 is a hypothetical B-H magnetization curve illustrating the definition of the important magnetic parameters of a magnetic coating including coercivity $H_c$, squareness S, switching field distribution S*, and orientation ratio O.R. Comparing the B-H curves of FIGS. 2a and 2b for a sample of prior art coating and a sample of the present coating indicates the clear superiority of the coating composition of the present invention in the important magnetic parameters measured. Similarly, the SEM photographs of FIGS. 2c and 2d clearly show the improved dispersion and alignment of the magnetic particles. These same advantages are also quite apparent from FIGS. 3a, 3b, 3c and 3d in comparing a disk coated with the prior art coating to a disk coated in accordance with the present invention.

Figure 4:
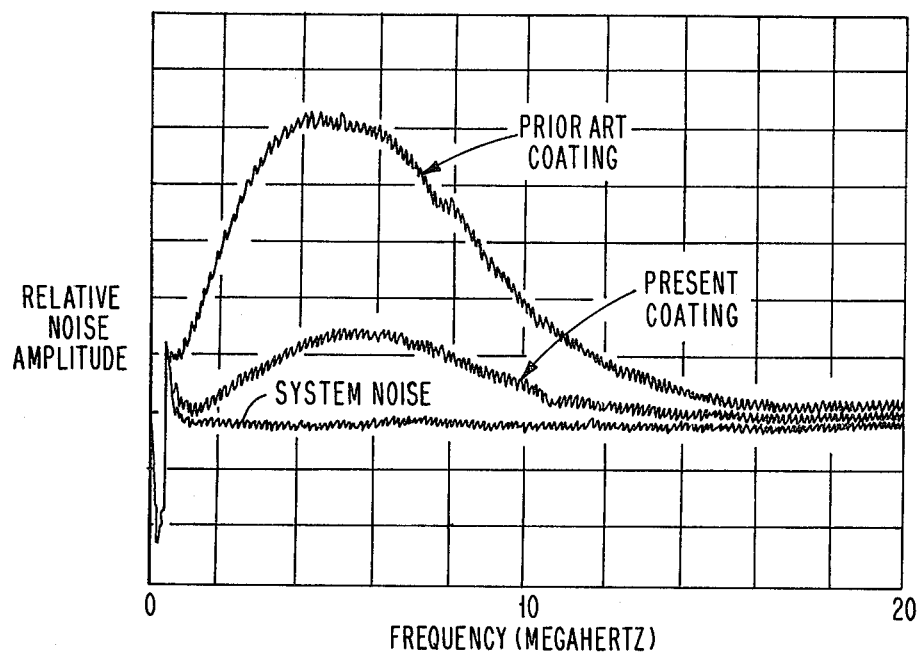
FIG. 4 shows the inherent magnetic noise characteristics of the present coating compared to those of the prior art coating.

FIG. 4 shows another important measure of the performance of a magnetic recording coating, that of inherent noise level. From FIG. 4 it can be seen that the inherent magnetic noise is significantly lower in the magnetic coating of the present invention than in the prior art coating.

The magnetic inks prepared using silica-coated particles showed superior coating characteristics, and thin coats (10–20 microinches) without any pin holes have been prepared. The alignment of magnetic particles in the magnetic field was found to be very high and the orientation ratio of coated disks was measured between 3.0 and 4.0 as compared with 2.0–2.8 for current formulations.

In addition to the epoxy/phenolic organic binder system described above, the silica-coated magnetic particles are useful in other less polar solvent binder systems, such as the polyurethane binder system described in copending application Ser. No. 304,445, filed Sept. 21, 1981 (RO9-80-008), provided the particle surface is chemically modified and thus more compatible with an organic environment. This compatibility is synonymous with particle dispersibility and it can be explained in terms of stronger covalent or polar interactions between the solvent and/or binder molecules and the particle surface rather than between surfaces of redispersed particles. There are many ways to render the silica surface hydrophobic or less polar and several of these approaches are listed below.

In one example, the particles are surface-esterified with alcohols at 180° C. for two hours. This reaction, when carried to completion, converts the hydrophilic surface of silica to one that is completely hydrophobic, as taught in U.S. Pat. No. 2,657,149:

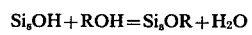

$$Si_sOH + ROH = Si_sOR + H_2O$$

where s refers to the surface of SiO$_2$

Depending on the formulation, other normal or branched alcohols can also be employed. After subsequent solvent exchange, the particles were shown to have an excellent compatibility with the polyurethane binders.

In another example, silane or titanate coupling agents can be used to change the chemistry of the silica interface. Generally amino-silanes, and particularly Z-6020 (Dow Chemical Co.) were found to be exceptionally effective in providing a good particle dispersion.

In another example, a methylating agent such as trichloromethyl silane was employed. The surface reaction was conducted in a non-aqueous solvent at room temperature. The particles were found to be compatible with polyurethane and epoxy/phenolic polymers and their non-polar solvents.

In the last example, the particles were redispersed with an ammonium oleate surfactant and heated above 95° C. for approximately 30 minutes. Under these conditions, the surfactant decomposed to oleic acid and the particles agglomerated to a water incompatible sludge. After decanting the excess of water, a non-polar solvent containing 2% oleic acid was added and the mixture was heated at 130° C. until all the water was evaporated. The resulting particles were found to have oleic acid molecules covalently bonded through their carboxylic groups, to the silica surface and the hydrocarbon part of the chain facing the solvent. Again, the compatibility with the above-mentioned systems was excellent.

We claim:

1. A method of manufacturing a magnetic coating composition containing magnetic particles, comprising the steps of:

leaching the dry magnetic particles in an acid to form a slurry;

adjusting the pH of the said slurry to between 3 and 4 to produce a positive electrostatic charge on said magnetic particles;

adding to said slurry a dispersion of colloidal particles having a pH between 3 and 4, the colloidal particles having a negative electrostatic charge thereon;

mixing said slurry with said dispersion in a water-based system, the opposite charges on said particles causing the colloidal particles to be attracted to and irreversibly bond to the magnetic particles;

removing the coated magnetic particles from said water-based system; and dispersing said coated magnetic particles in a water-free organic liquid binder system for application to a substrate, said colloidal particles coated on said magnetic particles preventing said magnetic particles from agglomerating to thereby improve the magnetic properties of said magnetic coating composition.

2. A method in accordance with claim 1 in which said organic binder system includes epoxy and phenolic resins.

3. A method in accordance with claim 1 in which said organic binder system includes polyurethanes.

4. A method in accordance with claim 3 including the step of modifying the surface of said colloidal particles by esterification before dispersing said coated magnetic particles in said polyurethane binder system.

5. A method in accordance with claim 1 in which said water is removed from said dispersion by filtration.

6. A method in accordance with claim 1 in which said water is removed from said dispersion by centrifugation.

7. A method in accordance with claim 1 in which said water is removed from said dispersion by magnetic separation.

8. A method in accordance with claim 1 including the step of ultrasonically mixing said magnetic particles to disperse said particles in said organic liquid binder system.

* * * * *